United States Patent
Pan et al.

(10) Patent No.: US 6,630,878 B2
(45) Date of Patent: Oct. 7, 2003

(54) MAGNETIC ROTATING APPARATUS

(75) Inventors: Long-Jyh Pan, Shijr (TW); Yung-Tsun Hsieh, Changhua (TW)

(73) Assignee: Benq Corporation, Taoyuan Shien (TW)

( * ) Notice: Subject to any disclaimer, the term of this patent is extended or adjusted under 35 U.S.C. 154(b) by 0 days.

(21) Appl. No.: 10/383,388

(22) Filed: Mar. 7, 2003

(65) Prior Publication Data

US 2003/0169139 A1 Sep. 11, 2003

(30) Foreign Application Priority Data

Mar. 8, 2002 (TW) ........................................ 91104438 A

(51) Int. Cl.$^7$ ................................................ H01F 7/20
(52) U.S. Cl. ...................... 335/285; 335/288; 335/302; 335/306; 455/90; 379/433.13
(58) Field of Search ................................ 335/285, 287, 335/288, 302, 306; 455/90, 575; 379/433.11, 433.13, 440

(56) References Cited

U.S. PATENT DOCUMENTS 5,706,332 A * 1/1998 Nagai ...................... 455/575.3
6,151,486 A * 11/2000 Holshouser et al. ...... 455/575.3

* cited by examiner

*Primary Examiner*—Ramon M. Barrera
(74) *Attorney, Agent, or Firm*—Thomas, Kayden, Horstemeyer & Risley

(57) ABSTRACT

A magnetic rotating apparatus is used for connecting a body portion and a rotating portion of a foldable product. The body portion has an assembling portion while the rotating portion has a pivot portion. The rotating portion is secured to the body portion by engaging the pivot portion with the assembling portion, so that the rotating portion is allowed to pivot on the body portion and be positioned at the first stable equilibrium or the second stable equilibrium. The magnetic rotating apparatus comprises a magnetic body component situated in the assembling portion and a magnetic pivot component situated in the pivot portion. The magnetic body component and the magnetic pivot component are disposed as mates. Also, the opposite surfaces of the magnetic pivot component and the magnetic body component have the same polarity. When the rotating portion and the body portion are maintained at the first stable equilibrium, the magnetic pivot component is positioned at one side adjacent to the magnetic body component. When the rotating portion and the body portion are maintained at the second stable equilibrium, the magnetic pivot component is positioned at the other side adjacent to the magnetic body component.

8 Claims, 3 Drawing Sheets

MAGNETIC ROTATING APPARATUS

This application claims the benefit of Taiwan application Serial No. 091104438, filed Mar. 8, 2002.

BACKGROUND OF THE INVENTION

1. Field of the Invention

The invention relates in general to a rotating apparatus, and more particularly, to a rotating apparatus utilizing magnetic components.

2. Description of the Related Art

In the modern electronic products, it is desirable to design a cover that can protect the important elements of the electronic products, such as the LCD screen and keypad, from dust and other pollutants that can have damaging effects. In addition, the cover assembled on the electronic product can vary the aesthetic appearance, by allowing for flexibility in the exterior design. FIG. 1 is a perspective view of a flip-type cellular phone. The flip-type cellular phone 100 includes a phone body 110, flip cover 120, and a rotating apparatus 130 for connecting the flip cover 120 and the phone body 110. As shown by the direction of the arrow in FIG. 1, the rotating apparatus 130 allows the pivoting of the flip cover 120 on the phone body 110, and the opened condition or closed condition of the cellular phone 100 can be achieved. Generally, the conventional design of rotating apparatus 130 includes a cam-spring hinge or a cam-leaf spring hinge. Hence, the cellular phone 100 possesses the snap characteristic, wherein the flip cover 120 in a certain angle is snapped into the fully-opened position or fully-closed position.

This conventional design, however, suffers from several drawbacks. After frequent usage, the conventional cam-spring hinge will gradually lose the property of returning to the initial state following deformation. Also, the cam can wear out easily with time. The worn cam will reduce the deformable state of the spring, and consequently decrease the elastic force generated by the deformed spring. Therefore, both issues of wear with time and elasticity decay will shorten the utility life span of the rotating apparatus.

SUMMARY OF THE INVENTION

It is therefore an object of the invention to provide a simple structure of the magnetic rotating apparatus for replacing the conventional cam-spring hinge, so that the cover of the applied product can be semi-automatically opened and closed. Moreover, the conventional bulky hinge is substituted by the pivot portion of the magnetic rotating apparatus, and the overall size of applied product is greatly reduced.

The invention achieves the above-identified objects by providing a magnetic rotating apparatus for connecting a body portion and a rotating portion of a foldable product. The body portion has an assembling portion, and the rotating portion has a pivot portion. The rotating portion is secured to the body portion by engaging the pivot portion with the assembling portion, so that the rotating portion can pivot on the body portion and be positioned at a first stable equilibrium or a second stable equilibrium. The magnetic rotating apparatus comprises a magnetic body component situated in the assembling portion, and a magnetic pivot component situated in the pivot portion. The magnetic body component and the magnetic pivot component are disposed as mates. Also, the opposite surfaces of the magnetic pivot component and the magnetic body component have the same polarity. When the rotating portion and the body portion are maintained at the first stable equilibrium, the magnetic pivot component is positioned at one side adjacent to the magnetic body component. When the rotating portion and the body portion are maintained at the second stable equilibrium, the magnetic pivot component is positioned at the other side adjacent to the magnetic body component.

Other objects, features, and advantages of the invention will become apparent from the following detailed description of the preferred but non-limiting embodiment. The following description is made with reference to the accompanying drawings.

DETAILED DESCRIPTION OF THE INVENTION

Figure 1:
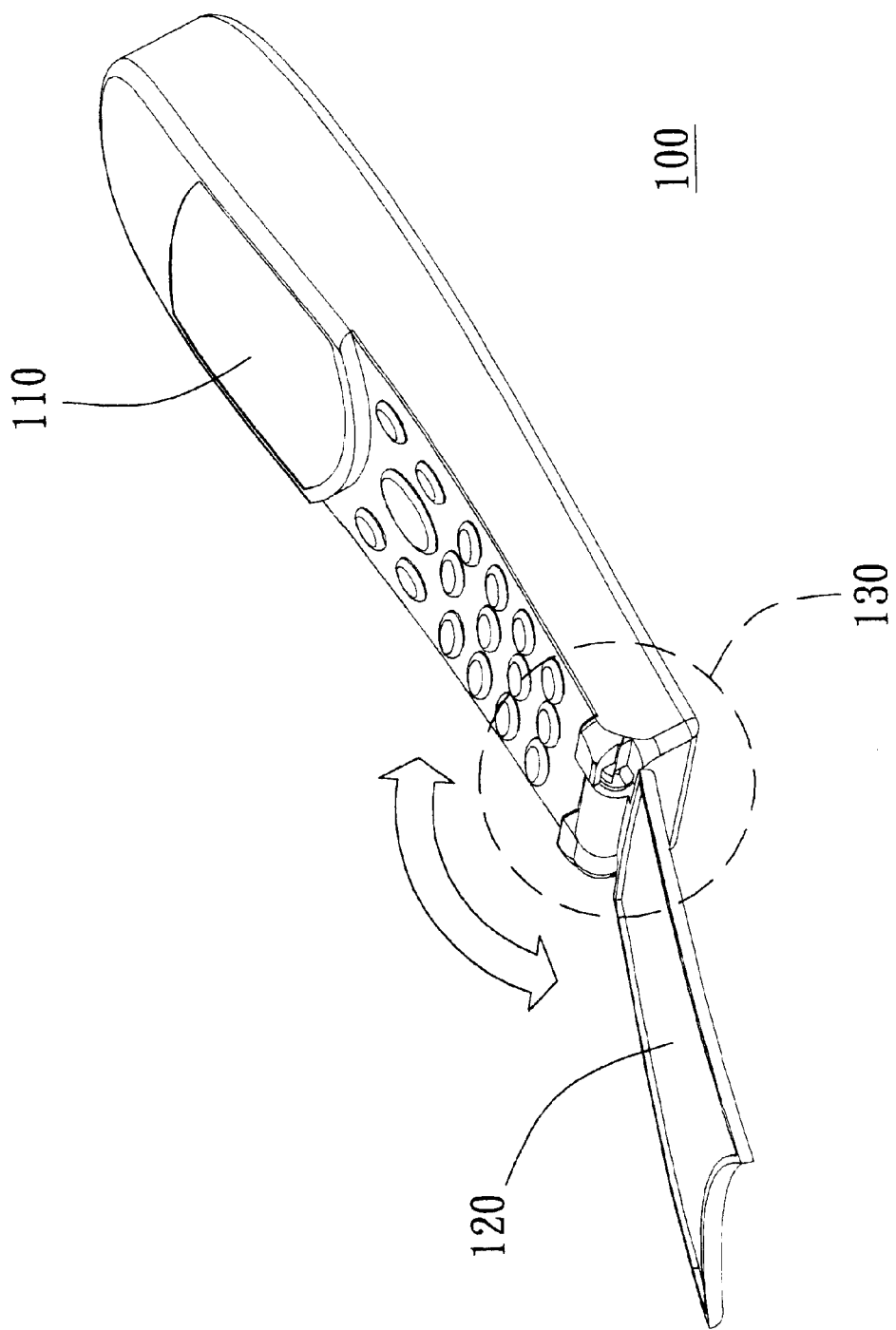
FIG. 1 (Prior Art) is a perspective view of a flip-type cellular phone.
Figure 2A:
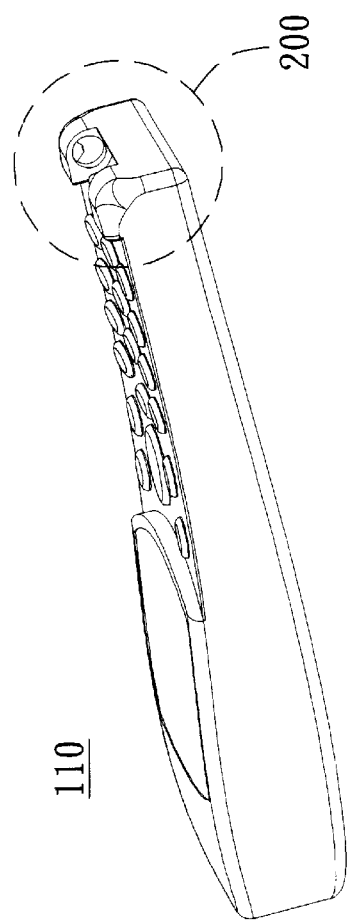
FIG. 2A is a perspective view of a phone body according to the embodiment of the invention.
Figure 2B:
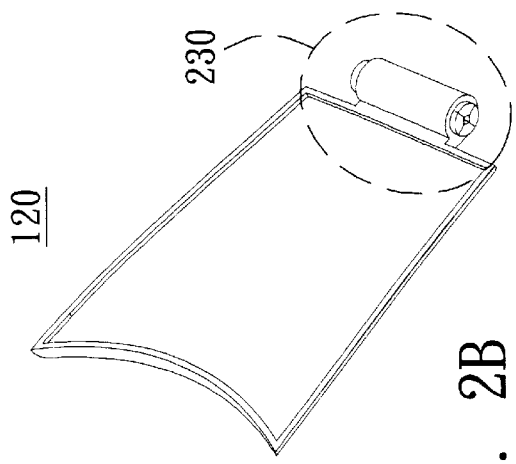
FIG. 2B is a perspective view of a flip cover according to the embodiment of the invention.
Figure 2C:
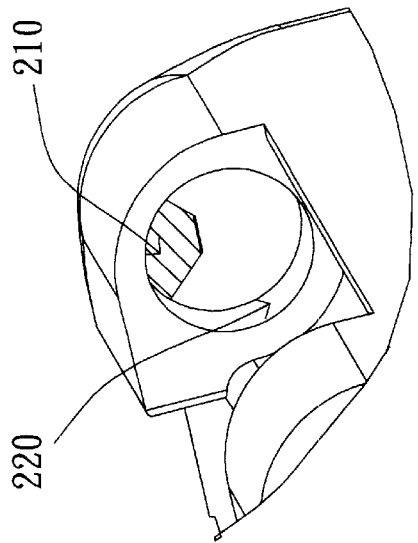
FIG. 2C is a partially enlarged view of the assembling portion of FIG. 2A.
Figure 2D:
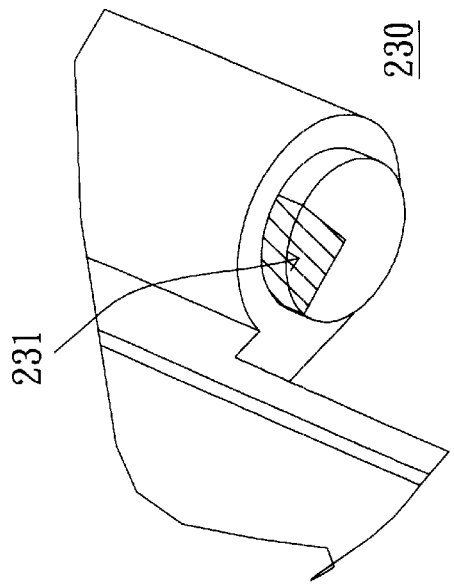
FIG. 2D is a partially enlarged view of the pivot portion of FIG. 2B.

In the present invention, the magnetic rotating apparatus is used for connecting a rotating portion and a body portion of a foldable device, such that the device can be semi-automatically opened and closed. A flip-type cellular phone is taken for illustration in the preferred embodiment. The phone body 110 and the flip cover 120 respectively represent the body portion and the rotating portion, both of which are connected by a magnetic hinge. FIG. 2A is a perspective view of a phone body according to the embodiment of the invention. An assembling portion 200 is formed on the phone body 110. FIG. 2B is a perspective view of a flip cover according to the embodiment of the invention. A pivot portion 230 is formed on the flip cover 120. By engaging the pivot portion 230 with the assembling portion 200, the flip cover 120 is secured and pivoted to the phone body 110. FIG. 2C is a partially enlarged view of the assembling portion of FIG. 2A. The assembling portion 200 includes a magnetic body component 210 and a pivot receptacle 220. The pivot receptacle 220 is shaped to receive the pivot pin on the pivot portion 230. FIG. 2D is a partially enlarged view of the pivot portion of FIG. 2B. A magnetic pivot component 231 is formed as part of the pivot pin of the pivot portion 230. During assembly, the pivot pin of the pivot portion 230 is inserted to the pivot receptacle 220, while the magnetic pivot component 231 and the magnetic body component 210 are disposed as mates. Consequently, the flip cover 120 is allowed to pivot on the phone body 110. Also, the opposite surfaces of the magnetic pivot component 231 and the magnetic body component 210 have the same polarity. In the practical application, the material of the magnetic pivot component 231 and the magnetic body component 210 can be magnet or electromagnet.

The magnetic pivot component 231 and the magnetic body component 210 repel each other, so that the pivot portion 230 is rotated in the clockwise or counterclockwise direction. The rotation of the pivot portion 230 is stopped if it hits the obstructed configuration, and thereby a stable equilibrium is achieved. For example, the pivot portion 230, driven by the repulsive force between the magnetic pivot component 231 and the magnetic body component 210, is rotated counterclockwise until the flip cover 120 is fully-closed (the first stable equilibrium), or rotated clockwise until the flip cover 120 is fully-opened (the second stable equilibrium). When the flip cover 120 is maintained in the first stable equilibrium or fully-closed position, the magnetic pivot component 231 is positioned at one side adjacent to the magnetic body component 210. When the flip cover 120 is maintained in the second stable equilibrium or fully-opened position, the magnetic pivot component 231 is positioned at the other side adjacent to the magnetic body component 210.

As the user opens the flip cover 120, an external force is required to open the flip cover 120 to a magnetic force balance position. Above this position, the repulsive force between the magnetic pivot component 231 and the magnetic body component 210 will pivotally open the flip cover 120 to the second stable equilibrium, that is, to a fully-opened state. On the contrary, below the magnetic force balance position, the repulsive force will close the flip cover 120 to the first stable equilibrium, or, to a fully-closed state. If the external force is terminated before the flip cover 120 reaches the magnetic force balance position, the flip cover 120 will automatically return to the fully-closed position (the first stable equilibrium). If the external force is terminated after the flip cover 120 passes through the magnetic force balance position, the generated repulsive magnetic force will rotate the flip cover 120 to the second stable equilibrium, so that the flip cover 120 will keep opening automatically. Similarly, the magnetic force also functions in this manner in the open-to-close situation of the flip cover 120.

Figure 3:
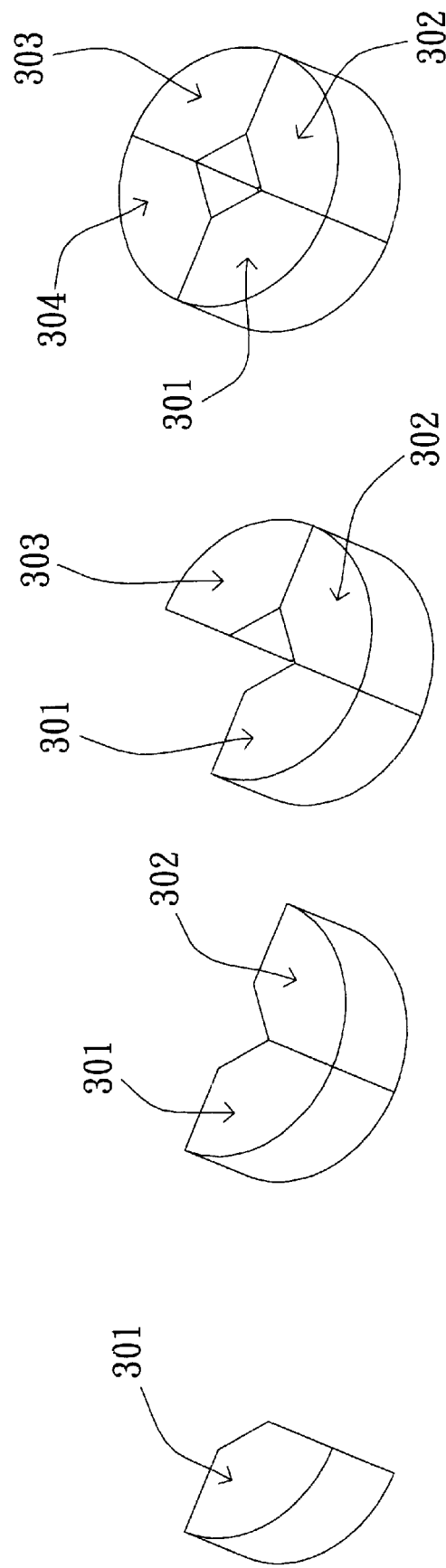
FIG. 3 illustrates the alternative designs of the magnetic body component of FIG. 2C and the magnetic pivot component of FIG. 2D.

By virtue of the structure detailed in the foregoing description, the magnetic rotating apparatus of the invention possesses the characteristic that the flip cover 120 can automatically snap into the fully-opened position or snap into the fully-closed position when it is opened to a magnetic force balance position, or a certain angle practically. However, it is noted that the structure of the invention is not limited herein. FIG. 3 illustrates the alternative designs of the magnetic body component of FIG. 2C and the magnetic pivot component of FIG. 2D. The numbers of the magnetic pivot component 231 and the magnetic body component 210 can be optionally varied according to the practical application. Nevertheless, it is critical that the adjacent magnetic components have opposite polarities. As shown in FIG. 3, the magnetic components 301 and 302 have opposite polarities, and the magnetic components 303 and 304 have opposite polarities. However, the magnetic components 301 and 303 have the same polarity, and the magnetic components 302 and 304 have the same polarity.

In the preferred embodiments disclosed herein, the advantages of the magnetic rotating apparatus of the invention are:

1. The conventional spring type hinge apparatus faces the problem of elasticity decay after frequent usage. The magnetic material adopted in the invention does not wear out easily with time and has no issue of elasticity decay. Therefore, the utility life span of the rotating apparatus is greatly prolonged.

2. The pivot portion of the invention, functioning as a hinge mechanism, is smaller than the conventional cam-spring hinge; hence, the overall size of applied product can be reduced.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A magnetic rotating apparatus, for connecting a body portion and a rotating portion of a foldable device, the body portion having an assembling portion, the rotating portion having a pivot portion, the rotating portion secured to the body portion by engaging the pivot portion with the assembling portion so that the rotating portion can pivot on the body portion and be positioned at a first stable equilibrium or at a second stable equilibrium, the magnetic rotating apparatus comprising:

a magnetic body component, situated in the assembling portion; and a magnetic pivot component, situated in the pivot portion and disposed with the magnetic body component as mates, the opposite surfaces of the magnetic pivot component and the magnetic body component having same polarity;

wherein the magnetic pivot component is positioned in one side adjacent to the magnetic body component when the rotating portion and the body portion are maintained at the first stable equilibrium, and the magnetic pivot component is positioned in the other side adjacent to the magnetic body component when the rotating portion and the body portion are maintained at the second stable equilibrium.

2. The magnetic rotating apparatus according to claim 1, wherein the magnetic rotating apparatus is adopted in a flip-type cellular phone.

3. The magnetic rotating apparatus according to claim 2, wherein the body portion is a phone body.

4. The magnetic rotating apparatus according to claim 2, wherein the rotating portion is a flip cover.

5. The magnetic rotating apparatus according to claim 1, wherein the material of the magnetic body component is magnet.

6. The magnetic rotating apparatus according to claim 1, wherein the material of the magnetic body component is electromagnet.

7. The magnetic rotating apparatus according to claim 1, wherein the material of the magnetic pivot component is magnet.

8. The magnetic rotating apparatus according to claim 1, wherein the material of the magnetic pivot component is electromagnet.

* * * * *